United States Patent Office

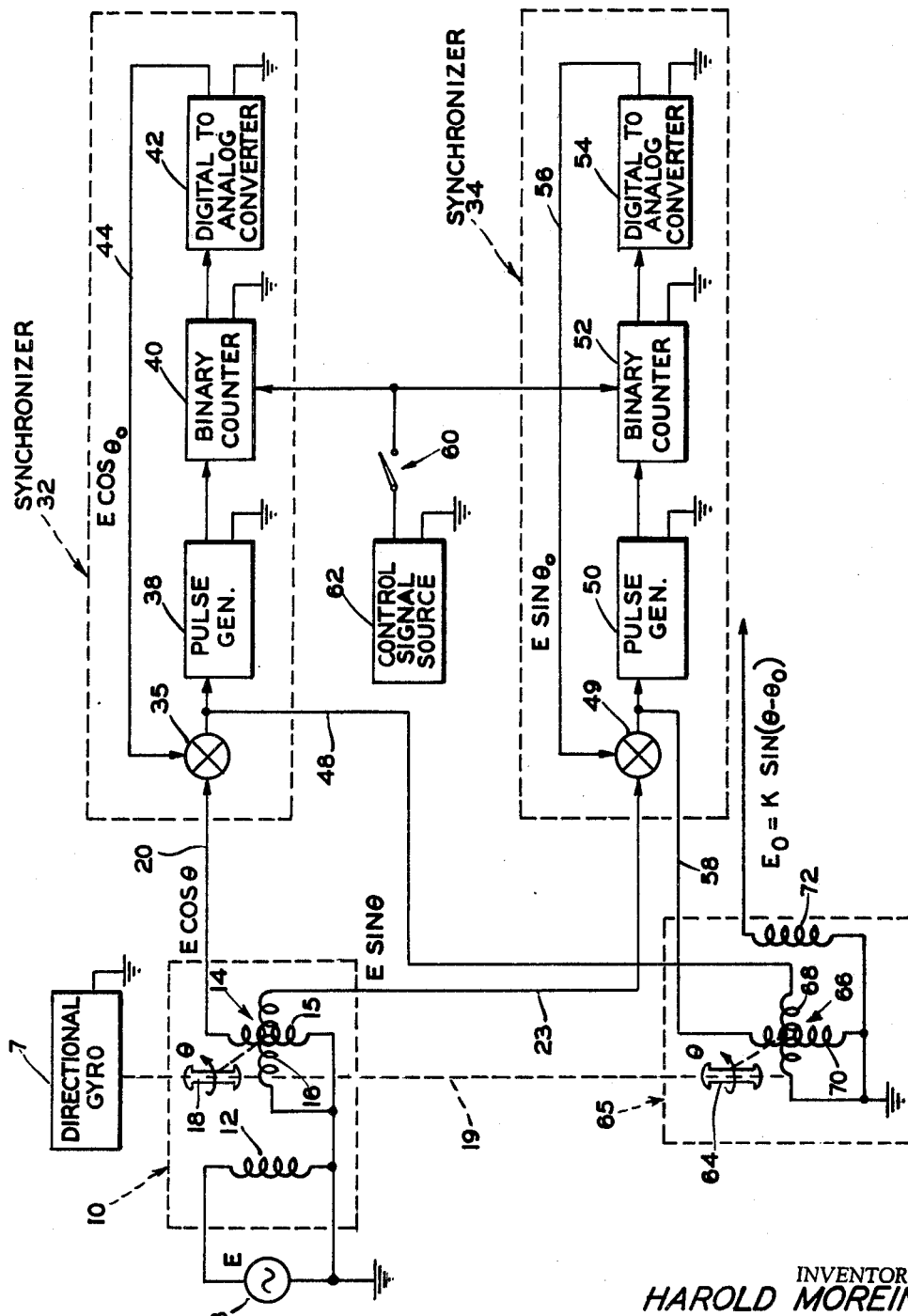

3,501,758
Patented Mar. 17, 1970

3,501,758
APPARATUS FOR SYNCHRONIZING
RESOLVER DATA
Robert Ludlow James, Bloomfield, and Harold Moreines, Springfield, N.J., assignors to The Bendix Corporation, a corporation of Delaware
Filed June 22, 1967, Ser. No. 648,158
Int. Cl. G08c; G06g 7/22
U.S. Cl. 340—198   8 Claims

ABSTRACT OF THE DISCLOSURE

Apparatus for synchronizing signals provided by a signal device including an input winding and an output winding carried by an angularly displaceable element for providing signals corresponding to the sine and cosine of the angular displacement. The signals are synchronized and the synchronized signals are connected to the input winding of another signal device, and which input winding is carried by an angularly displaceable element. The angularly displaceable elements are connected so that when the first mentioned of said elements is angularly displaced in response to a condition the last mentioned element provides at an output winding of the other signal device a synchronized output as a function of the difference between angular displacement of the elements in response to the condition and angular displacement at a predetermined synchronizing instant.

CROSS REFERENCE TO RELATED APPLICATIONS

The present invention employs a digital synchronizer such as that disclosed and claimed in copending U.S. application Ser. No. 558,327, filed June 17, 1966, by Robert L. James and assigned to The Bendix Corporation, assignee of the present invention.

BACKGROUND OF THE INVENTION

Field of the invention

This invention relates to synchronizing modulated carrier signals such as may be used in automatic flight control systems and, more particularly, to synchronizing signals such as generated at the rotor leads of a resolver transmitter and which signals are periodic with respect to the angular orientation of the resolver rotor coils.

Description of the prior art

Heretofore electromechanical synchronizers were used to synchronize flight control system input signals. In order to achieve advantages with respect to weight, space and reliability, solid state digital synchronizers such as the synchronizer described and claimed in the aforenoted copending U.S. application Ser. No. 558,327 were developed. However, these synchronizers were designed for two-wire systems and direct application to three-wire resolver systems involves ambiguities. Thus, application of the digital synchronizer to either of the resolver output coils provides a synchronized signal $E_o'$ as follows:

$$E_o' = E \sin (\theta + \phi) - E \sin (\theta_0 + \phi) \quad (1)$$

where:

$\theta$ = angular displacement of the resolver rotor in response to a condition.
$\theta_0$ = angular displacement of resolver rotor at a predetermined synchronizing instant.
$\phi$ = relative angular orientation of the coil.

The synchronizer output gradient is as follows:

$$dE_o'/d\theta = E \cos (\theta + \phi) \quad (2)$$

The output gradient at the synchronizing instant $(\theta = \theta_0)$ is as follows:

$$dE_o'/d\theta = E \cos (\theta_0 + \phi) \quad (3)$$

Equation 3 illustrates that the aforementioned ambiguities depend upon angular displacement of the resolver rotor at the synchronizing instant $\theta_0$ and the particular coil used as represented by angle $\phi$.

SUMMARY OF THE INVENTION

The device of the present invention provides a synchronized output in the form $E_o = K \sin (\theta - \theta_0)$. The output gradient is as follows:

$$dE_o/d\theta = K \cos (\theta - \theta_0) \quad (4)$$

The output gradient at the synchronizing instant $(\theta = \theta_0)$ is as follows:

$$dE_o/d\theta = K \cos 0° = K \quad (5)$$

Equation 5 illustrates that the gradient, at the synchronizing instant, is a constant K, independent of $\theta$ and $\phi$, and thus the aforenoted ambiguities are avoided.

This invention contemplates a signal device having an input element energized by a source of alternating current and an angularly displaceable output element for providing two signals corresponding to the sine and cosine of the angular displacement in response to a condition. Signals corresponding to the sine and cosine of the angular displacement at a predetermined synchronizing instant are provided and are applied to an angularly displaceable input element of another signal device. The input element of the other signal device is connected to the output element of the first signal device so as to be angularly displaced therewith, whereby a signal is provided at an output element of the second signal device corresponding to the sine of the difference between the angular displacement in response to the condition and the angular displacement at the synchronizing instant.

One object of this invention is to provide a device having weight, space and reliability advantages for synchronizing signals from a resolver transmitter.

Another object of this invention is to synchronize said signals to provide a constant error gradient about any preselected reference point so that the synchronized signal is free of ambiguities.

Another object of this invention is to employ apparatus of the type used for synchronizing non-periodic two-wire signals for synchronizing periodic three-wire signals so as to resolve ambiguities.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

DESCRIPTION OF THE DRAWINGS

The single figure in the drawing shows apparatus for synchronizing signals provided by a resolver transmitter and embodying the present invention.

With reference to the figure there is shown a resolver transmitter 10 having an input winding 12 energized by a voltage E from an alternating current source 8 and an output winding 14 having two mutually perpendicular coils 15 and 16 carried by a rotor 18. When rotor 18 is angularly displaced through an angle $\theta$ by, for example, a directional gyro 7, signals $E \sin \theta$ and $E \cosine \theta$ are induced in the coils 16 and 15, respectively, of the output winding 14.

A conductor 20 leading from the coil 15 of the output winding 14 is connected to a synchronizer 32 and a conductor 23 leading from the coil 16 of the output winding 14 is connected to a synchronizer 34. The synchronizer 32 is of the type disclosed in the aforenoted copending U.S. application Ser. No. 558,327 and includes a pulse generator 38 which modulates the signals from coil 15 applied through a summation device 35 and provides pulses having a frequency corresponding to the amplitude of the signal. The pulses are applied to a binary counter 40 which counts the pulses and provides a digital output corresponding to the total number of pulses generated in a predetermined interval and the digital output is applied to a digital to analog converter 42 which converts the digital output to an analog output. The analog output is applied through a feedback conductor 44 to the summation means 35 and is combined thereat with the signal from coil 15 in a sense so as to provide a null output at a synchronizer output conductor 48.

The synchronizer 34 is of a type similar to the synchronizer 32 and includes a pulse generator 50 which modulates the signal from coil 16 of output winding 14 applied through a summation device 49 and provides pulses having a frequency corresponding to the amplitude of the signal, a binary counter 52 which counts the pulses and provides a digital output corresponding to the total number of pulses generated in the predetermined interval and a digital to analog converter 54 which converts the digital output to an analog output. The analog output is applied through a feedback conductor 56 to summation means 49 and combined thereat with the signal from coil 16 in a sense so as to provide a null output at a synchronizer output conductor 58.

At some predetermined synchronizing instant, which may, for purposes of example, correspond to a predetermined flight condition, a switch 60 is manually or automatically closed to apply a signal from a control signal source 62 to the counters 40 and 52 whereby the counters are inhibited from counting. At this synchronizing instant and thereafter until the switch 60 is opened, the output applied to summation means 35 through the feedback conductor 44 corresponds in amplitude to $E \cos \theta_0$ and the output applied to the summation means 49 through the feedback conductor 56 corresponds in amplitude to $E \sin \theta_0$, where $\theta_0$ is the angular displacement of resolver rotor 18 at the synchronizing instant. Thus, an error signal is provided at the synchronizer output conductor 48 corresponding to the difference between the signals from output winding 15 and converter 42 ($E \cos \theta - E \cos \theta_0$) and a signal is provided at the synchronizer output conductor 58 corresponding to the difference between the signals from output winding 16 and converter 54 ($E \sin \theta - E \sin \theta_0$).

Resolver rotor 18 is connected by suitable mechanical means 19 to a rotor 64 of a resolver 65. Resolver 65 has an input winding 66 carried by the rotor 64, and which input winding 66 has two mutually perpendicular coils 68 and 70. Coil 70 of input winding 66 is connected to synchronizer output conductor 58 and coil 68 of input winding 66 is connected to synchronizer output conductor 48. Thus, when resolver rotor 64 is angularly displaced in accordance with the angular displacement $\theta$ of resolver rotor 18 effected by directional gyro 7, coil 70 provides a signal corresponding to $K' \cos \theta$ [$E \sin \theta - E \sin \theta_0$] and coil 68 provides a signal corresponding to $K' \sin \theta$ [$E \cos \theta - E \cos \theta_0$] where $K'$ is the resolver transformation constant. The arrangement is such that the signals are of opposite polarities so as to induce in an output winding 72 of resolver 65 a signal corresponding to the difference therebetween, and which signal corresponds to $K$ ($\sin \theta - \theta_0$) as will hereinafter be analytically shown.

OPERATION

The operation of the device of the present invention may best be illustrated by mathematically analyzing the function of the structural elements described herein.

Thus, output winding 14 of resolver 10 provides at the coil 15 signal $E \cos \theta$ and provides at the coil 16 signal $E \sin \theta$. Summation means 35 sums the signal from coil 15 and the feedback signal applied through conductor 44 providing at the conductor 48 signal $E \cos \theta - E \cos \theta_0$. Summation means 49 sums the signal from coil 16 and the feedback signal applied through conductor 56 providing at the conductor 58 signal $E \sin \theta - E \sin \theta_0$. Coil 70 of resolver 65 provides a signal as follows:

$$K'E \cos \theta [\sin \theta - \sin \theta_0]$$

Coil 68 of resolver 65 provides a signal as follows:

$$K'E \sin \theta [\cos \theta - \cos \theta_0]$$

The signal induced in winding 72 is the difference between the signals or:

$$E_o = K'E \sin \theta \cos \theta_0 - K'E \cos \theta \sin \theta_0$$

Appropriate substitution of trigonometric identities provides an expression for $E_o$ as follows:

$$E_o = K'E \sin \theta \cos \theta_0 - K'E \cos \theta \sin \theta_0, E_o = K \sin (\theta - \theta_0) \quad (6)$$

The synchronized output $E_o$ provided in accordance with the invention is free of ambiguities and provides a constant error gradient about any preselected reference. Moreover, this result is achieved with distinct advantages regarding weight, space and reliability since the apparatus is particularly adaptable for construction wtih solid state components.

Although only one embodiment of the invention has been illustrated and described, various changes in the form and relative arrangements of the parts, which will now appear to those skilled in the art may be made without departing from the scope of the invention.

What is claimed is:
1. A synchronizer comprising:
   a signal device having an input element connected to a voltage source and energized thereby, and having an angularly displaceable output element inductively connected to the input element for providing signals corresponding to the sine and cosine of the angular displacement in response to a condition;
   means connected to the signal device and responsive to the signals therefrom for providing signals corresponding to the sine and cosine of the angular displacement at a predetermined synchronizing instant; and
   signal means having an angularly displaceable input element connected to the output element of the signal device so as to be angularly displaced therewith, and having an output element inductively connected to the input element and connected to the last mentioned means and responsive to the signals therefrom for providing a synchronized signal corresponding to the sine of the difference between the angular displacement in response to a condition and the angular displacement at the synchronizing instant.
2. A synchronizer as described by claim 1 wherein the means connected to the signal device and responsive to the signals therefrom for providing signals corresponding to the sine and cosine of the angular displacement at a predetermined synchronizing instant comprises:
   first means connected to the signal device and responsive to the signal corresponding to the sine of the angular displacement in response to a condition for providing a signal equal and opposite to said signal;
   second means connected to the signal device and responsive to the signal corresponding to the cosine of the angular displacement in response to a condition for providing a signal equal and opposite to said signal; and
   control means connected to the first and second means and operable at the predetermined synchronizing instant for rendering the first means effective for providing the signal corresponding to the sine of the angular displacement at the predetermined synchronizing instant and for rendering the second means effective for providing the signal corresponding to the cosine of the angular displacement at the predetermined synchronizing instant.

3. A synchronizer as described by claim 2 wherein the first and second means each include:
   a pulse generator responsive to one of the signals from the signal device for providing pulses having a frequency corresponding in amplitude to said signal;
   a counter for counting the pulses and for providing a digital output corresponding to the total number of said pulses generated in a predetermined interval; and
   a converter for converting the digital output to an analog output.

4. A synchronizer as described by claim 3, wherein: the control means is connected to the counter included in the first means and to the counter included in the second means for inhibiting said counters from counting at the predetermined synchronizing instant.

5. A synchronizer as described by claim 2 including: first summation means connected to the signal device and to the first means and responsive to the signal corresponding to the sine of the angular displacement in response to a condition and responsive to the signal corresponding to the sine of the angular displacement at the predetermined synchronizing instant for providing a first summation signal;
   second summation means connected to the signal device and to the second means and responsive to the signal corresponding to the cosine of the angular displacement in response to a condition and responsive to the signal corresponding to the cosine of the angular displacement at the predetermined synchronizing instant for providing a second summation signal; and
   the input element of the signal means being connected to the first and second summation means and responsive to the first and second summation signals therefrom for providing the synchronized signal at the output element of said signal means.

6. A synchronizer as described by claim 5 wherein the input element of the signal means includes:
   a first coil connected to the first summation means so as to be energized by the first summation signal therefrom;
   a second coil connected to the second summation means so as to be energized by the second summation signal therefrom; and
   said first and second coils cooperating to provide the synchronized signal at the output element of the signal means when the input element is angularly displaced in accordance with the angular displacement of the output element of the signal device.

7. A synchronized as described by claim 6, wherein: the first and second coils of the input element are mutually perpendicular and provide at the output element of the signal means a signal corresponding to the difference between the product of the first summation signal and the cosine of the angular displacement of the input element and the product of the second summation signal and the sine of the angular displacement of the input element.

8. A synchronizer as described by claim 1, wherein: the output element of the signal device includes two mutually perpendicular coils and is connected to a condition sensor so as to be angularly displaced thereby;
   the signal corresponding to the sine of said angular displacement in response to a condition is provided at one of said coils; and
   the signal corresponding to the cosine of the angular displacement in response to the condition is provided at the other of said coils.

References Cited

UNITED STATES PATENTS 3,328,691  6/1967  Harac _____ 340—198

THOMAS B. HABECKER, Primary Examiner

U.S. Cl. X.R.

23.5—186